(12) United States Patent
Ai et al.

(10) Patent No.: US 12,182,901 B2
(45) Date of Patent: Dec. 31, 2024

(54) INTERLEAVING AND REARRANGEMENT TO REDUCE A NUMBER OF DIMENSIONS OF IMAGE

(71) Applicant: Tencent Technology (Shenzhen) Company Limited, Guangdong (CN)

(72) Inventors: Tong Ai, Shenzhen (CN); Feng Li, Shenzhen (CN); Haoyuan Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 192 days.

(21) Appl. No.: 17/991,416

(22) Filed: Nov. 21, 2022

(65) Prior Publication Data

US 2023/0083565 A1    Mar. 16, 2023

Related U.S. Application Data

(63) Continuation of application No. PCT/CN2022/086217, filed on Apr. 12, 2022.

(30) Foreign Application Priority Data

Apr. 26, 2021 (CN) .......................... 202110451609.0

(51) Int. Cl.
*G06T 1/60*    (2006.01)
*G06T 9/00*    (2006.01)

(52) U.S. Cl.
CPC . *G06T 1/60* (2013.01); *G06T 9/00* (2013.01)

(58) Field of Classification Search
CPC ...................................................... G06T 1/60
See application file for complete search history.

(56) References Cited

U.S. PATENT DOCUMENTS

2018/0096226 A1* 4/2018 Aliabadi ............. G06F 18/2137
2020/0349424 A1* 11/2020 Guo .......................... G06N 5/04

FOREIGN PATENT DOCUMENTS

CN    106779057 A    5/2017
CN    108875904 A    11/2018
(Continued)

OTHER PUBLICATIONS

International Search Report and Written Opinion in PCT/CN2022/086217, mailed on May 19, 2022, 11 pages.
(Continued)

*Primary Examiner* — Shivang I Patel
(74) *Attorney, Agent, or Firm* — ArentFox Schiff LLP

(57) ABSTRACT

An image data processing method is provided. In the method, a first image data set that includes image data arranged according to a first data format is acquired. The first data format has a first number of dimensions. Interleaving and rearrangement are performed on the image data in the first image data set based on a convolution operation to obtain a second image data set. The image data in the second image data set is arranged according to a second data format. The second data format has a second number of dimensions. The second number of dimensions of the second data format is less than first number of dimensions of the first data format. A target output result is generated based on the convolution operation performed on the second image data set and a second weight data set. Apparatus and non-transitory computer-readable storage medium counterpart embodiments are also contemplated.

20 Claims, 10 Drawing Sheets

(56) References Cited

FOREIGN PATENT DOCUMENTS

| | | |
|---|---|---|
| CN | 110033085 A | 7/2019 |
| CN | 110163790 A | 8/2019 |
| CN | 110309837 A | 10/2019 |
| CN | 111695682 A | 9/2020 |
| CN | 112215754 A | 1/2021 |
| CN | 112990370 A | 6/2021 |
| JP | 2019-535079 A | 12/2019 |

OTHER PUBLICATIONS

Kim et al., "Performance analysis of CNN frameworks for GPUs," 2017 IEEE International Symposium on Performance Analysis of Systems and Software (ISPASS), 2017, pp. 55-64.

First Office Action in CN202110451609.0, mailed on Jun. 30, 2021.

Shu, Jiaming, "Implementation and Optimization of Convolutional Neural Network Library on Sunway Platform," A dissertation for master's degree, University of Science and Technology of China, May 26, 2019, 86 pages (English Translation of Title p. 3, English Translation of Abstract p. 7).

MA-fn (Am), "CNN Convolution Processing (Mainly Im2Col)", Python Amateur of Machine Learning #5, Qiita, Japan, Jan. 4, 2021, Available on internet at: https://qiita.com/MA-fn/items/Qiita Japan, 18 pages.

Office Action received for Japanese Patent Application No. 2023-524148, mailed on Apr. 16, 2024, 10 pages (6 pages of English Translation and 4 pages of Original Document).

\* cited by examiner

INTERLEAVING AND REARRANGEMENT TO REDUCE A NUMBER OF DIMENSIONS OF IMAGE

RELATED APPLICATIONS

The present application is a continuation of International Application No. PCT/CN2022/086217, entitled "PROCESSING METHOD AND APPARATUS FOR IMAGE DATA, STORAGE MEDIUM, AND ELECTRONIC DEVICE" and filed on Apr. 12, 2022, which claims priority to Chinese Patent Application No. 202110451609.0, entitled "IMAGE DATA PROCESSING METHOD AND APPARATUS, STORAGE MEDIUM, AND ELECTRONIC DEVICE" and filed on Apr. 26, 2021. The entire disclosures of the prior applications are hereby incorporated by reference in their entirety.

FIELD OF THE TECHNOLOGY

This application relates to the field of computers, including to an image data processing method and apparatus, a storage medium, and an electronic device.

BACKGROUND OF THE DISCLOSURE

Currently, in the related art, a computing mode is generally that each output is a thread group. Processing is performed on image data by using a single instruction multiple data (SIMD). For example, in a process of performing a convolution operation by using the SIMD, an input dimension is [N, C, H, W]=[1, 1, 5, 5], and a dimension of a convolution kernel is $[C_{out}, C_{in}, kernel\_h, kernel\_w]$=[1, 1, 3, 3]. Convolution calculation is performed, and an output with a dimension of [N, C, H, W]=[1, 1, 5, 5] is finally generated, where N, C, H, and W respectively represent a batch, the quantity of channels, a height, and a width; and $C_{out}$ represents the quantity of output channels of the convolution kernel, $C_{in}$ represents the quantity of input channels of the convolution kernel, kernel_h represents the height of the convolution kernel, and kernel_w represents the width of the convolution kernel.

Data arrangement of the related technical solutions is usually only for the dimension of [N, C, H, W]. In addition, compared with a related data expression manner, for the convolution operation, according to arrangement features of a computer memory, if a size of the convolution kernel is relatively small and a size of the input space is relatively large, for the completeness of the acquired information, operations such as an edge-filling operation needs to be performed on the input. Moreover, because data is acquired through cross channels, cache miss and additional data copying overhead are caused, which can seriously affect the operating performance of a device in a computing process, thereby reducing the efficiency of processing image data.

For the foregoing problems, no effective solution has been provided yet.

SUMMARY

Embodiments of this disclosure provide an image data processing method and apparatus, a non-transitory computer-readable storage medium, and an electronic device, so as to at least address a technical problem of the relatively low efficiency in processing image data in the related art.

According to an aspect of an embodiment of this disclosure, an image data processing method is provided. In the method, a first image data set that includes image data arranged according to a first data format is acquired. The first data format has a first number of dimensions. Interleaving and rearrangement are performed on the image data in the first image data set based on a convolution operation to obtain a second image data set. The image data in the second image data set is arranged according to a second data format. The second data format has a second number of dimensions. The second number of dimensions of the second data format is less than first number of dimensions of the first data format. A target output result is generated based on the convolution operation performed on the second image data set and a second weight data set.

According to another aspect of an embodiment of this disclosure, an image data processing apparatus including processing circuitry is further provided. The processing circuitry is configured to acquire a first image data set that includes image data arranged according to a first data format, the first data format having a first number of dimensions. The processing circuitry is configured to perform interleaving and rearrangement on the image data in the first image data set based on a convolution operation to obtain a second image data set. The image data in the second image data set is arranged according to a second data format. The second data format has a second number of dimensions. The second number of dimensions of the second data format is less than first number of dimensions of the first data format. Further, the processing circuitry is configured to generate a target output result based on the convolution operation performed on the second image data set and a second weight data set.

According to still another aspect of this disclosure, a non-transitory computer-readable storage medium is further provided, storing instructions which when executed by a processor cause the processor to perform the image data processing method.

According to still another aspect of this disclosure, an electronic device is further provided, including a memory and a processor, the memory storing a computer program, and the processor being configured to perform the image data processing method through the computer program.

According to still another aspect of this disclosure, a computer program product is further provided, including computer instructions, the computer instructions, when read and executed by a processor of a computer device, causing the computer device to perform the image data processing method.

In an embodiment of this disclosure, by implementing in-depth optimization of a calculation process in a process of processing the image data, data rearrangement is correspondingly performed on input image data, output image data, and a calculation weight in the calculation process. Compared with a related calculation mode, the additional data copy overhead is reduced, and the probability of the occurrence of cache miss is reduced, so that the technical effects of optimizing the calculation performance of a device and improving the efficiency of processing the image data are implemented, and the technical problem of relatively low efficiency of processing image data existing in the related art is resolved.

BRIEF DESCRIPTION OF THE DRAWINGS

The accompanying drawings described herein are used for providing a further understanding of this disclosure, and form part of this disclosure. Exemplary embodiments of this disclosure and descriptions thereof are used for explaining this disclosure, and do not constitute any limitation to the scope of this disclosure. In the accompanying drawings.

DESCRIPTION OF EMBODIMENTS

The following describes technical solutions in embodiments of this disclosure with reference to the accompanying drawings. The described embodiments are only some of the embodiments of this disclosure rather than all of the embodiments. Other embodiments are within the scope of this disclosure.

In the specification, claims, and the foregoing accompanying drawings of this disclosure, the terms "first", "second", and so on are intended to distinguish similar objects but do not necessarily indicate a specific order or sequence. It may be understood that the data used in such a way is interchangeable in proper circumstances, so that the embodiments of this disclosure described herein can be implemented in other sequences than the sequence illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

First, some terms that appear during descriptions of the embodiments of this disclosure are applicable to the following explanations:
  CNN: Convolutional neural network (CNN);
  SIMD: Single instruction multiple data (SIMD);
  Metal: An abstract framework that can access a hardware graphics processing unit (GPU);
  Buffer: Metal buffer (Metal represents a conventional memory);
  Texture: Metal texture (Metal represents a memory of a texture);
  [N, C, H, W]: A representation manner of a dimension of data, [batch, channel, height, width] respectively represent [batch, quantity of channels, height, width];
  $C_{out}$: The quantity of output channels of a convolution kernel;
  $C_{in}$: The quantity of input channels of a convolution kernel;
  kernel_h: A height of a convolution kernel; and
  kernel_w: A width of a convolution kernel.

Technical solutions of this disclosure are described below with reference to exemplary embodiments.

Figure 1:
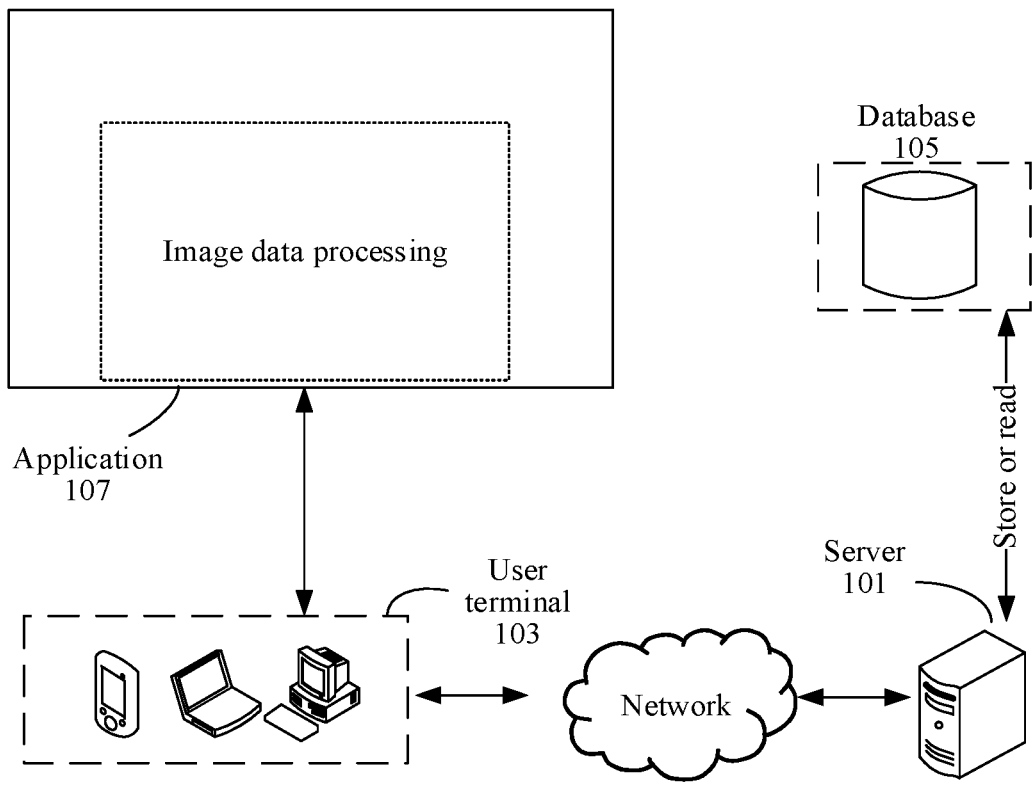
FIG. 1 is a schematic diagram of an application environment of an image data processing method according to an embodiment of this disclosure.

According to an aspect of this disclosure, an image data processing method is provided. The image data processing method may be applied to a hardware environment including a server 101 and a user terminal 103 as shown in FIG. 1. As shown in FIG. 1, the server 101 is connected to the user terminal 103 through a network, and can be used for providing services for the user terminal or a client installed on the user terminal. A client may be a video client, an instant messaging client, a browser client, an educational client, a game client, or the like. A database 105 may be arranged on a server or independently arranged from the server, configured to provide a data storage services for the server 101, for example, an image data storage service. The network may include, but is not limited to, a wired network and a wireless network. The wired network includes: a local area network, a metropolitan area network, and a wide area network. The wireless network includes: Bluetooth, Wi-Fi, and another network implementing wireless communication. The user terminal 103 may be a terminal configured with an application 107 and may include, but is not limited to, at least one of the following: computer devices such as a mobile phone (such as an Android phone, an iOS phone, and the like), a notebook computer, a tablet computer, a palmtop computer, a mobile Internet device (MID), a PAD, a desktop computer, a smart TV, and the like. The server may be an independent server, a server cluster consisting of a plurality of servers, or a cloud server, and the application 107 using the image data processing method is displayed through the user terminal 103.

As shown in FIG. 1, the image data processing method may be implemented in the user terminal 103 through the following steps:
  S1. Acquire a to-be-processed first image data set in the application 107 of the user terminal 103, image data in the first image data set being arranged according to a first data format;
  S2. Perform interleaving and rearrangement on data in the first image data set in the application 107 of the user terminal 103 to obtain a second image data set, image data in the second image data set being arranged according to a second data format, a manner of the interleaving and rearrangement matching a convolution operation, and a dimension of the second data format being less than that of the first data format; and
  S3. Perform the convolution operation on the second image data set and pre-acquired second weight data set in the application 107 of the user terminal 103 to obtain a target output result.

In an embodiment, the image data processing method may further include, but is not limited to, being used by a client configured in the server.

In an embodiment, the image data processing method may include, but is not limited to, asynchronous use by the user terminal 103 and a client arranged in the server 101. For example, the steps S1 and S2 are performed by the application 107 of the user terminal 103, and the step S3 is performed by the client arranged in the server 101. The above is only an example, and is not specifically limited in this embodiment.

Figure 2:
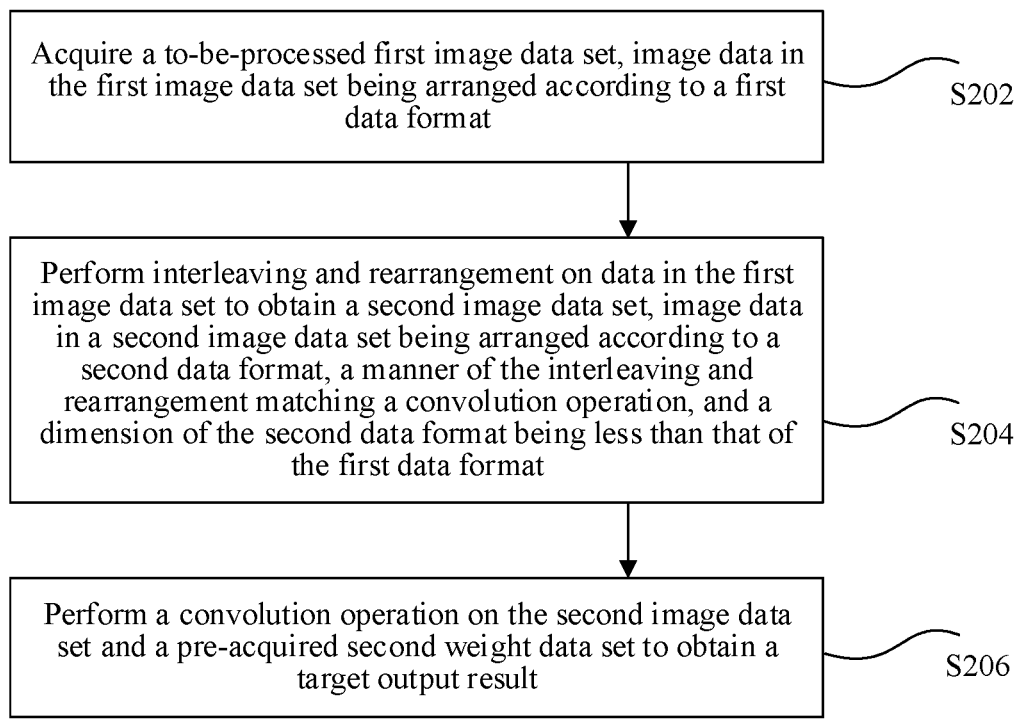
FIG. 2 is a schematic flowchart of an image data processing method according to an embodiment of this disclosure.

As an implementation, as shown in FIG. 2, the image data processing method includes the following steps:

In step S202, a to-be-processed first image data set is acquired, image data in the first image data set being arranged according to a first data format;

In step S204, interleaving and rearrangement are performed on data in the first image data set to obtain a second image data set, image data in the second image data set being arranged according to a second data format, a manner of the interleaving and rearrangement matching a convolution operation, and a dimension of the second data format being less than that of the first data format; and In step S206, the convolution operation is performed on the second image data set and a pre-acquired second weight data set to obtain a target output result.

In an embodiment, the image data in the first data format may include, but is not limited to, being arranged according to a data format of $N_1 \times C_1 \times H_1 \times W_1$, where $N_1$ represents a quantity of image data subsets included in the first image data set, $C_1$ represents a quantity of channels in each of the image data subsets, $H_1$ represents a data height in each of the image data subsets in the first image data set, and $W_1$ represents a data width in each of the image data subsets in the first image data set.

Figure 3:
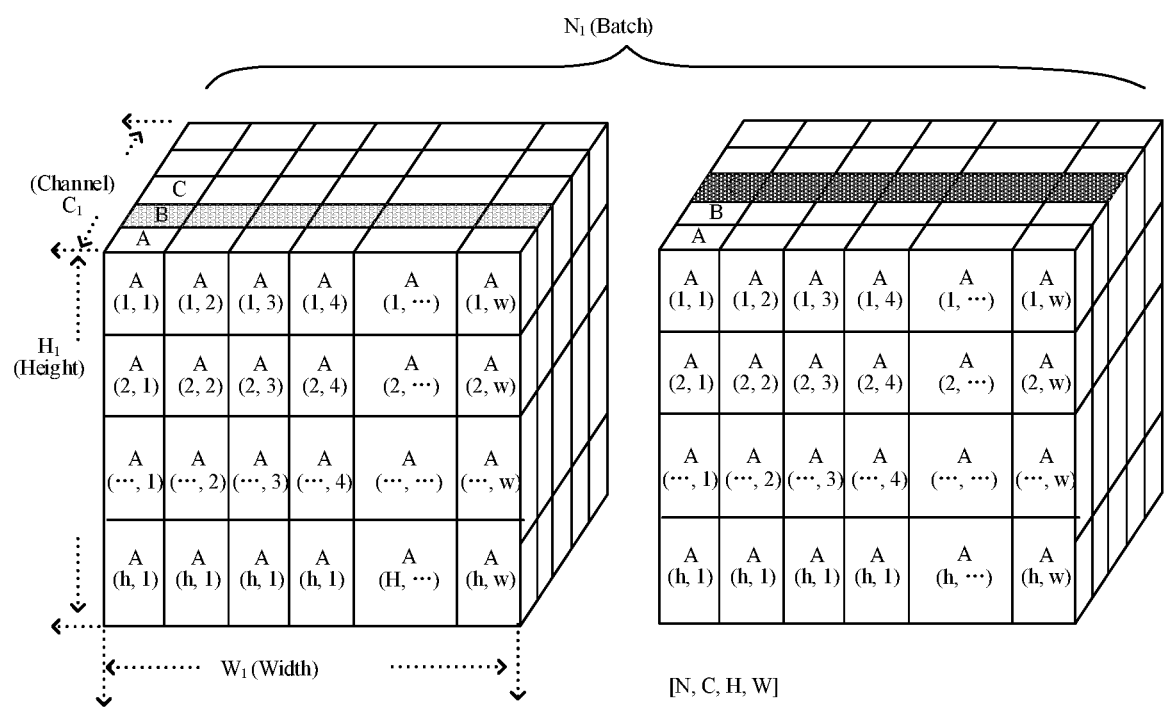
FIG. 3 is a schematic diagram of an image data processing method according to an embodiment of this disclosure.

For example, FIG. 3 is a schematic diagram of still another image data processing method according to an embodiment of this disclosure. The image data in the first image data set is arranged according to the data format of $N_1 \times C_1 \times H_1 \times W_1$, which may include, but is not limited to, the example shown in FIG. 3. $N_1$ represents the quantity of image data subsets included in the first image data set. FIG. 3 shows that $N_1=2$. In other words, in a process of processing the image data shown in FIG. 3, two batches of to-be-processed data are included, where one batch is equal to one image data subset, and $C_1$ represents the quantity of channels in each of the image data subsets. FIG. 3 shows that $C_1=5$, indicating that the batch of to-be-processed data includes five channels of to-be-processed data. $H_1$ represents a data height in each of the image data subsets. FIG. 3 shows that $H_1=h$, and $W_1$ represents a data width in each of the image data subsets. FIG. 3 shows that $W_1=w$, and "A, B, C" represent image data in different channels.

In an embodiment, application scenarios of the image data processing method may include, but are not limited to, a plurality of application scenarios that need to perform image data processing, such as medical treatment, finance, credit reporting, banking, games, energy, education, buildings, games, transportation, IoT, industry, and artificial intelligence. The application scenarios may include, but are not limited to, being applied in a neural network forward computing library. Because the neural network forward computing library provides the computing capability of all neural network algorithms, application scenarios of this disclosure may cover all application scenarios using the neural network forward computing library, for example, including, but not limited to, applications related to AI algorithms associated with cloud technology, such as a virtual background.

The cloud technology is a hosting technology that unifies a series of resources such as hardware, software, and networks in a wide area network or a local area network to implement computing, storage, processing, and sharing of data.

The cloud conference is an efficient, convenient and low-cost conference form based on the cloud computing technology. Users only need to perform simple and easy operations through Internet interfaces, and can quickly, efficiently and synchronously share voice, data files and videos with teams and customers around the world. Complex technologies such as data transmission and processing in conferences are provided by a cloud conference service provider to assist in operations of help the users to operate.

At present, cloud conferences mainly focus on service content of a software as a service (SaaS) mode, including calls, networks, videos and other service forms. Video conferences based on the cloud computing are referred to as cloud conferences.

In the era of the cloud conferences, data transmission, processing, and storage are all performed by computer resources of video conference manufacturers providers. The users do not need to purchase expensive hardware or install cumbersome software at all. The users only need to open browsers and log in to corresponding interfaces to conduct efficient teleconferences.

A cloud conference system supports multi-server dynamic cluster deployment and provides a plurality of high-performance servers, which greatly improves stability, security and availability of conferences. In recent years, because video conferences can greatly improve communication efficiency, continuously reduce communication costs, and bring an upgrade in internal management level, the video conferences have been welcomed by a plurality of, and are popular among many, users and have been widely used in a plurality of fields such as transportation, transmission, finance, operators, education, enterprises, or the like. There is no doubt that after using the cloud computing, the video conferences will be more attractive and competitive in terms of convenience, speed and ease of use, which will stimulate arrival of a new upsurge in video conference applications.

Figure 4:
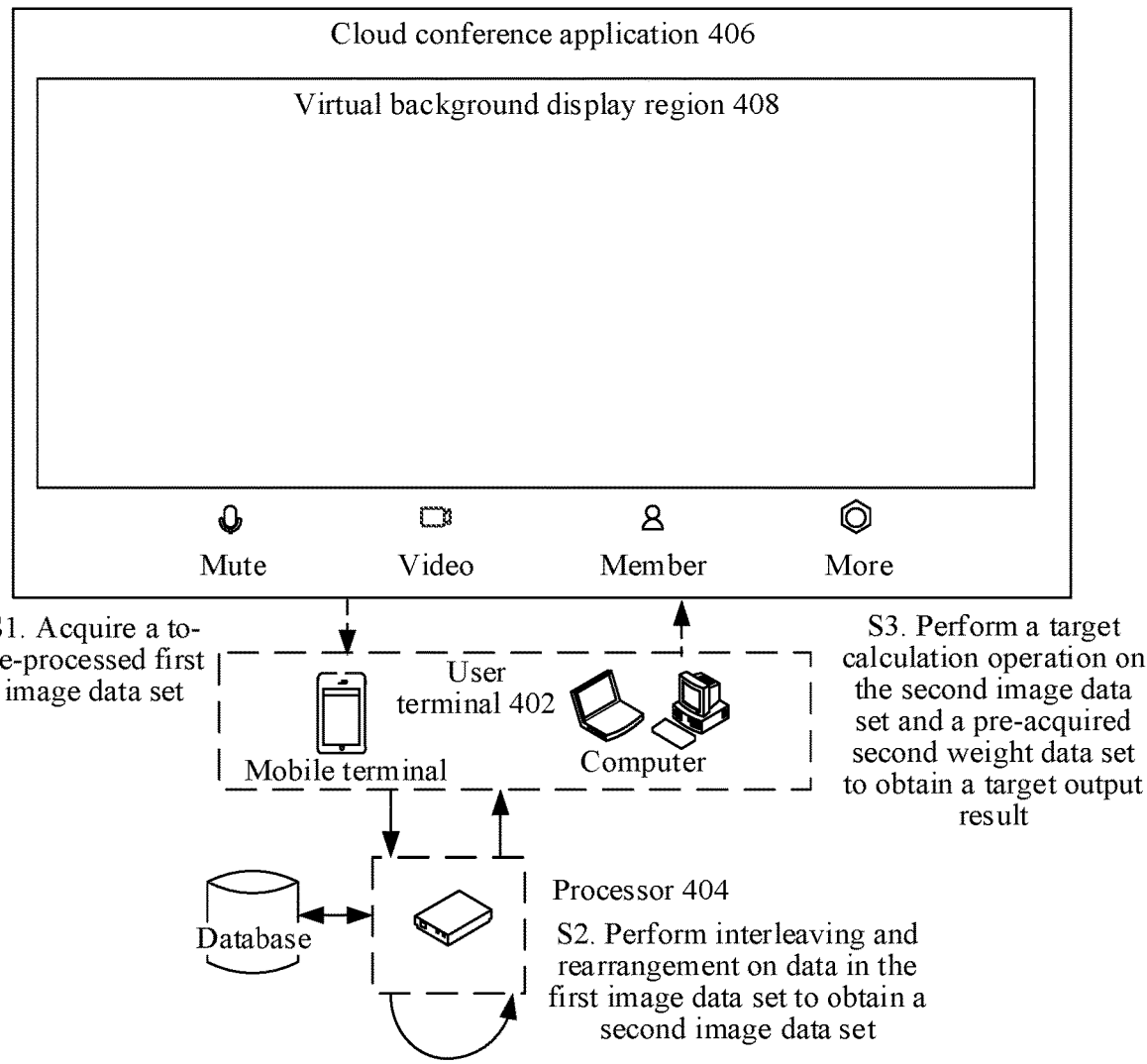
FIG. 4 is a schematic diagram of still another image data processing method according to an embodiment of this disclosure.

For example, using the image data processing method being applied in a cloud conference scenario as an example, FIG. 4 is a schematic diagram of an image data processing method according to an embodiment of this disclosure. As shown in FIG. 4, the method specifically includes, but is not limited to, the following steps:

S1. A user terminal 402 acquires a to-be-processed first image data set;

S2. A processor 404 located in the user terminal 402 or connected to the user terminal 402 performs interleaving and rearrangement on the data in the first image data set to obtain a second image data set; and S3. The convolution operation is performed on the second image data set and a pre-acquired second weight data set to obtain a target output result.

The first image data set may include, but is not limited to, the to-be-processed first image data set stored in a database as shown in FIG. 4. The target output result may include, but is not limited to, a virtual background to be displayed in a virtual background display region 408 of a cloud conference application 406 shown in FIG. 4, or other image data obtained after processing by using the image data processing method.

The above is only an example and is not limited in this embodiment.

In an embodiment, the performing the convolution operation on the second image data set and a pre-acquired second weight data set to obtain a target output result may include, but is not limited to, performing the convolution operation on the second image data set and the second weight data set to obtain the third image data set, where the convolution operation includes, but is not limited to, a convolution operation, and the target output result includes, but is not limited to, the third image data set. The second image data set is an image data set obtained by performing interleaving and rearrangement on $M_1$ channels of image data in each group of image data in $S_1$ groups of image data. $S_1$ groups of image data is the image data obtained by dividing each $M_1$ channels of image data in the first image data set into a group, and $M_1 \leq C_1$.

In an embodiment, the to-be-processed first image data set is acquired, where the image data in the first image data set is arranged according to a data format of $N_1 \times C_1 \times H_1 \times W_1$. Interleaving and rearrangement is performed on the data in the first image data set to obtain a second image data set, where image data in the second image data set is arranged according to a data format of $N_1 \times H_2 \times W_2$, and a manner of the interleaving and rearrangement matches a convolution operation. Through the deep optimization of the calculation process in the process of processing image data, data rearrangement is accordingly performed on the input image data, output image data, and a calculation weight in the calculation process, so as to rearrange data with a relatively high dimension into data with a relatively low dimension. In addition, in a subsequent process of performing convolution calculation, when data of different channels are processed, the data of a plurality of channels may be grouped, so that data may be extracted from different channels by cross-grouping, thereby effectively reducing the quantity of times of data extraction across channels. In the related art, each time data is extracted from different channels, the data needs to be extracted across channels. Therefore, compared with a conventional calculation mode, the technical solution recorded in this disclosure reduces the additional data copy overhead, and reduces the probability of the occurrence of cache miss, so that the technical effects of optimizing the calculation performance of a device and improving the efficiency of processing the image data are implemented, and the technical problem of relatively low efficiency of processing image data existing in the related art is resolved.

As an embodiment, the image data in the first image data set being arranged according to a first data format includes: arranging the image data in the first image data set according to the data format of $N_1 \times C_1 \times H_1 \times W_1$, where $N_1$ represents a quantity of image data subsets included in the first image data set, $C_1$ represents a quantity of channels in each of the image data subsets, $H_1$ represents a data height in each of the image data subsets in the first image data set, and $W_1$ represents a data width in each of the image data subsets in the first image data set; and the image data in the second image data set being arranged according to a second data format includes: performing interleaving and rearrangement on the data in the first image data set to obtain a second image data set, where the image data in the second image data set is arranged according to the data format of $N_1 \times H_2 \times W_2$, $H_2$ represents a data height in each of the image data subsets in the second image data set, and $W_2$ represents a data width in each of the image data subsets in the second image data set.

In an embodiment, the performing interleaving and rearrangement on data in the first image data set to obtain a second image data set may include, but is not limited to, performing interleaving and rearrangement on the image data in the first image data set to reduce the dimension of the image data and facilitate subsequent convolution operations.

Figure 5:
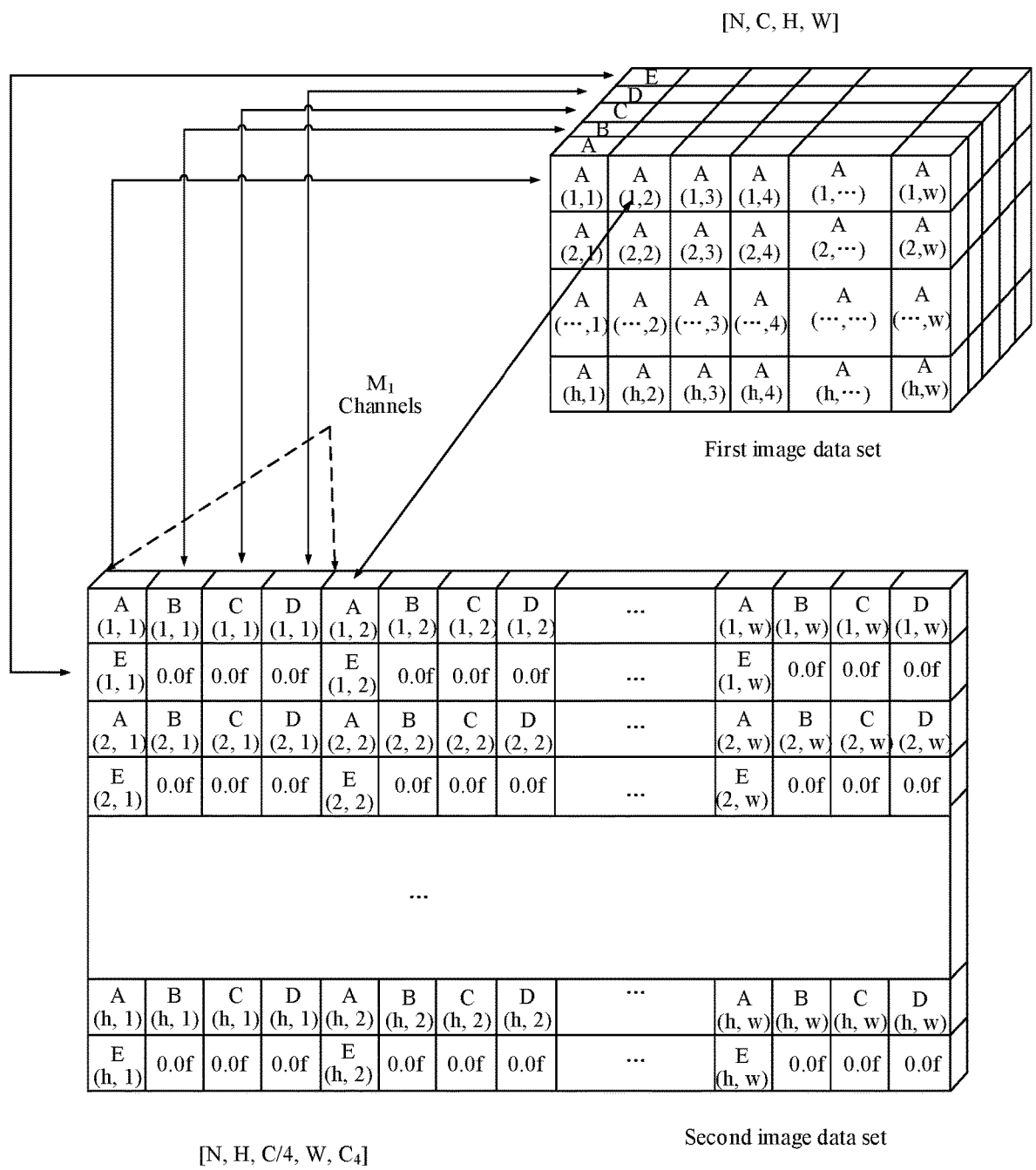
FIG. 5 is a schematic diagram of still another image data processing method according to an embodiment of this disclosure.

FIG. 5 is a schematic diagram of still another image data processing method according to an embodiment of this disclosure. The performing interleaving and rearrangement on data in the first image data set to obtain a second image data set may include, but is not limited to, as shown in FIG. 5, dividing the image data of each $M_1$ channels in the first image data set into a group, where $M_1 \leq C_1$, and performing interleaving and rearrangement on the image data of $M_1$ channels in each group of image data to obtain the second image data set. Using $M_1=4$ as an example, as shown in FIG. 5, each piece of image data is divided into $C_1/4$ groups according to each four channels as a group, and then the image data of four channel dimensions in each group in the form of interleaving (mixing) is rearranged to obtain a second image data set of a data structure of [N, H, C/4, W, $C_4$], where "A, B, C" represent image data in different channels.

For example, descriptions are made with reference to an example shown in FIG. 5.

A(1,1) data located in an upper left corner of the first image data set is located in the first row and first column in the first channel, and B(1,1) data is located in the first row and first column in the second channel. When performing the convolution operation, after extracting data of A(1,1), in a case that data of B(1,1) needs to be extracted, in the related art, a mode of extracting data in a channel A needs to be switched to a mode of extracting data in a channel B, that is, data extraction needs to be performed across channels. In an embodiment, by arranging the data of A(1,1) in the first row and the first column of the second image data set, and arranging the data of B(1,1) in the first row and the second column of the second image data set, after the data of A (1, 1) is extracted, the data of B (1, 1) may be directly extracted, which avoids problems such as cache miss caused by extracting data across channels.

As an embodiment, the performing interleaving and rearrangement on data in the first image data set to obtain a second image data set includes:
dividing image data of each $M_1$ channels in the first image data set into a group to obtain $S_1$ groups of image data, where $M_1 \leq C_1$; and
performing interleaving and rearrangement on the image data of the $M_1$ channels in each group of image data in the $S_1$ groups of image data to obtain the second image data set.

In an embodiment, the dividing the image data of each $M_1$ channels in the first image data set into a group to obtain $S_1$ groups of image data may include, but is not limited to, dividing the image data of each $M_1$ channels in the first image data set into a group to obtain $S_1$ groups of image data in a case that $C_1$ is an integer multiple of $M_1$, where $$S_1 = \frac{C_1}{M_1} \times H_1 \times W_1,$$

and increasing the quantity of channels in the first image data set from $C_1$ to $C_2$ to obtain the third image data set in a case that $C_1$ is not the integer multiple of $M_1$, where $C_2$ is the integer multiple of $M_1$, and the image data in a channel added in the third image data set is 0 (that is, the quantity of channels is supplemented to an integer multiple of $M_1$); and dividing image data of each $M_1$ channels in the third image data set into a group to obtain $S_1$ groups of image data, where $$S_1 = \frac{C_2}{M_1} \times H_1 \times W_1.$$

Figure 6:
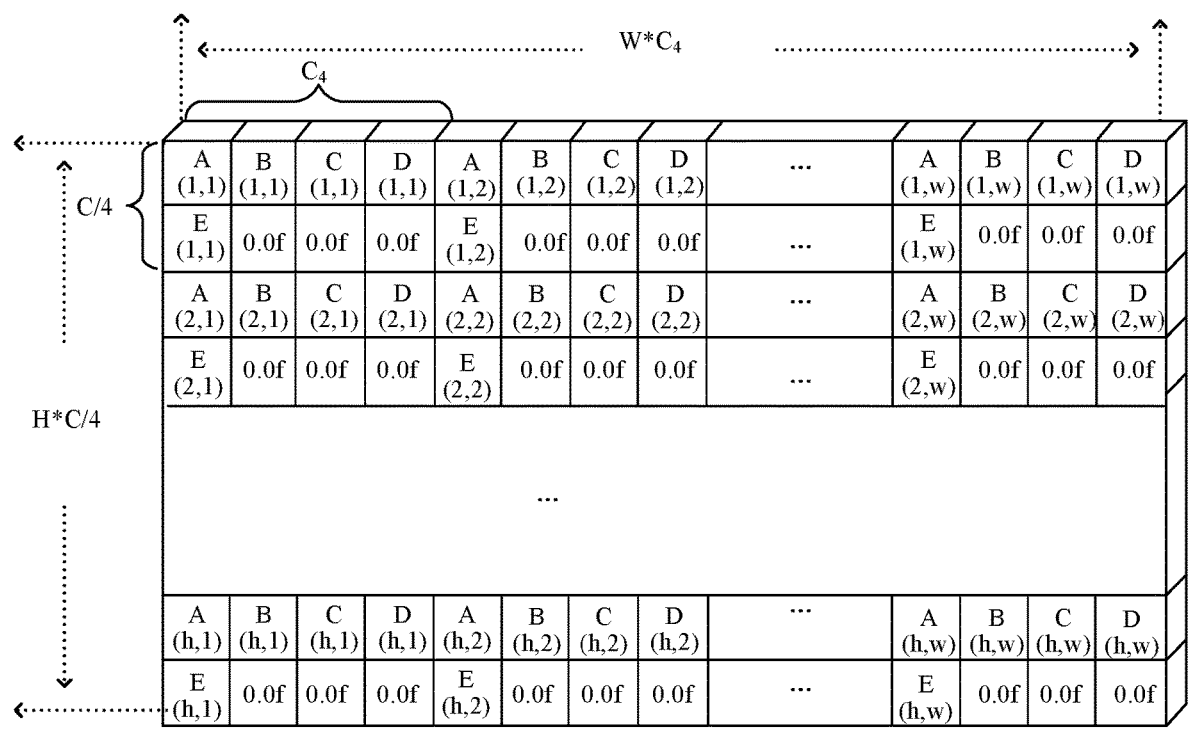
FIG. 6 is a schematic diagram of still another image data processing method according to an embodiment of this disclosure.

Using N=1 as an example, FIG. 6 is a schematic diagram of still another image data processing method according to an embodiment of this disclosure. The second image data set may include, but is not limited to, the example shown in FIG. 6, where "A, B, C" represent image data in different channels, and A(1,1), B(1,1), C(1,1), and D(1,1) are interleaved and rearranged into image data of the same height. The data of different channels in the image data are sequentially sorted, which improves the local performance of data access and may greatly reduce the probability of cache miss. In the related art, in a case that a size of the convolution kernel is not 1×1, when extracting features of an input image, for feature extraction of a boundary region, some additional regions need to be configured as 0, so as to implement the feature extraction of the boundary region. In an embodiment, because $M_1$ channels are packed and processed, when SIMD is used for performing a convolution operation, an edge-filling operation does not need to be performed on the boundary region, thereby saving the additional overhead of data copying.

Using FIG. 5 as an example, when a size of the convolution kernel is 3×3, when extracting feature data with B(2, 1) as a center point, in the related art, three feature points with a value of 0 need to be added on a left side of B(2, 1) in the first image data set, so as to implement feature extraction of the data of B(2, 1). However, after rearranging the data in an embodiment, the data on the left side of B(2,1) in the second image data set is the data of A(2,1). Therefore, an edge-filling operation does not need to be performed, and feature extraction may be directly performed based on B(2,1). That is, because interleaving and arrangement are reperformed on the to-be-processed data in n embodiment of this disclosure, in a process of extracting boundary data by using the convolution kernel, the quantity of edge-filling operations may be reduced. Data in different channels are placed in the same dimension, so as to achieve the effect of saving the additional overhead of data copying.

In an embodiment, the image data of each $M_1$ channels is divided in the first image data set into one group to obtain $S_1$ groups of image data, where $M_1 \leq C_1$, and interleaving and rearrangement are performed on the image data of the $M_1$ channels in each group of image data in the $S_1$ groups of image data to obtain the second image data set. Interleaving and rearrangement are performed on the data in the first image data set to obtain the second image data set. Compared with a conventional calculation mode, in which cache miss and the additional data copy overhead are prone to be caused, an embodiment reduces the probability of the occurrence of cache miss, so that the technical effects of optimizing the calculation performance of a device and improving the efficiency of processing the image data are implemented, and the technical problem of relatively low efficiency of processing image data existing in the related art is resolved.

As an embodiment, the dividing image data of each $M_1$ channels in the first image data set into a group to obtain $S_1$ groups of image data includes:

dividing image data of each $M_1$ channels in the first image data set into a group to obtain $S_1$ groups of image data in a case that $C_1$ is an integer multiple of $M_1$, where $$S_1 = \frac{C_1}{M_1} \times H_1 \times W_1;$$

and a quantity of channels in the first image data set is added from $C_1$ to $C_2$ to obtain the third image data set in a case that $C_1$ is not the integer multiple of $M_1$, where $C_2$ is the integer multiple of $M_1$, and the image data on a channel added in the third image data set is 0; and dividing image data of each $M_1$ channels in the third image data set into a group to obtain $S_1$ groups of image data, where $$S_1 = \frac{C_2}{M_1} \times H_1 \times W_1.$$

In an embodiment, the increasing a quantity of channels in the first image data set from $C_1$ to $C_2$ in a case that $C_1$ is not the integer multiple of $M_1$ may include, but is not limited to, $$C_2 = \frac{C_1}{M_1} \text{ rounding up} \times M_1,$$

and certainly, may also be rounded down or in other manners.

Using N=1, $C_1$=5, and $M_1$=4 as an example, if the quantity of channels $C_1$ is not divisible by 4, the quantity of channels is supplemented to an integer multiple of 4, and added activation values (corresponding to the image data) are all filled with 0. As shown in FIG. 5, the second row and the second column to the fourth column are all "0.0f".

The above is only an example and is not limited in this embodiment.

As an embodiment, the performing interleaving and rearrangement on the image data of the $M_1$ channels in each group of image data in the $S_1$ groups of image data to obtain the second image data set includes:

performing interleaving and rearrangement on the image data of the $M_1$ channels in each group of image data in the $S_1$ groups of image data to obtain the second image data set in a case that $C_1$ is an integer multiple of $M_1$, where $W_2 = M_1 \times W_1$, and $$H_2 = \frac{C_1}{M_1} \times H_1;$$

and performing interleaving and rearrangement on the image data of the $M_1$ channels in each group of image data in the $S_1$ groups of image data to obtain the second image data set in a case that $C_1$ is not the integer multiple of $M_1$, where $W_2 = M_1 \times W_1$, and $$H_2 = \frac{C_2}{M_1} \times H_1.$$

In an embodiment, as shown in FIG. 5, using N=1, $C_1$=5, and $M_1$=4 as an example, the $W_2=M_1 \times W_1$ is $W_2=w*C_4$ shown in FIG. 5, and $$H_2 = \frac{C_2}{M_1} \times H_1$$

is $H_2$=H*C/4 shown in FIG. 5.

In an embodiment, after rearranging a data structure into $N_1 \times H_2 \times W_2$, SIMD may be used for speeding up the convolution operation without the need to perform edge filling on the data, avoiding the additional overhead of data copying caused by performing edge filling during performing a convolution operation.

As an embodiment, the method further includes:
acquiring a preset first weight data set, where weight data in the first weight data set is arranged according to a data format of $N_2 \times C_2 \times H_3 \times W_3$, $N_2$ represents the quantity of weight data subsets included in the first weight data set, $C_2$ represents the quantity of channels in each of the weight data subsets, $H_3$ represents the data height in each of the weight data subsets, and $W_3$ represents the data width in each of the weight data subsets; and
performing interleaving and rearrangement on the data in the first weight data set to obtain the second weight data set, where weight data in the second weight data set is arranged according to a data format of $H_4 \times W_4$, $H_4$ represents a data height of the weight data in the second weight data set, and $W_4$ represents a data width of the weight data in the second weight data set.

Figure 7:
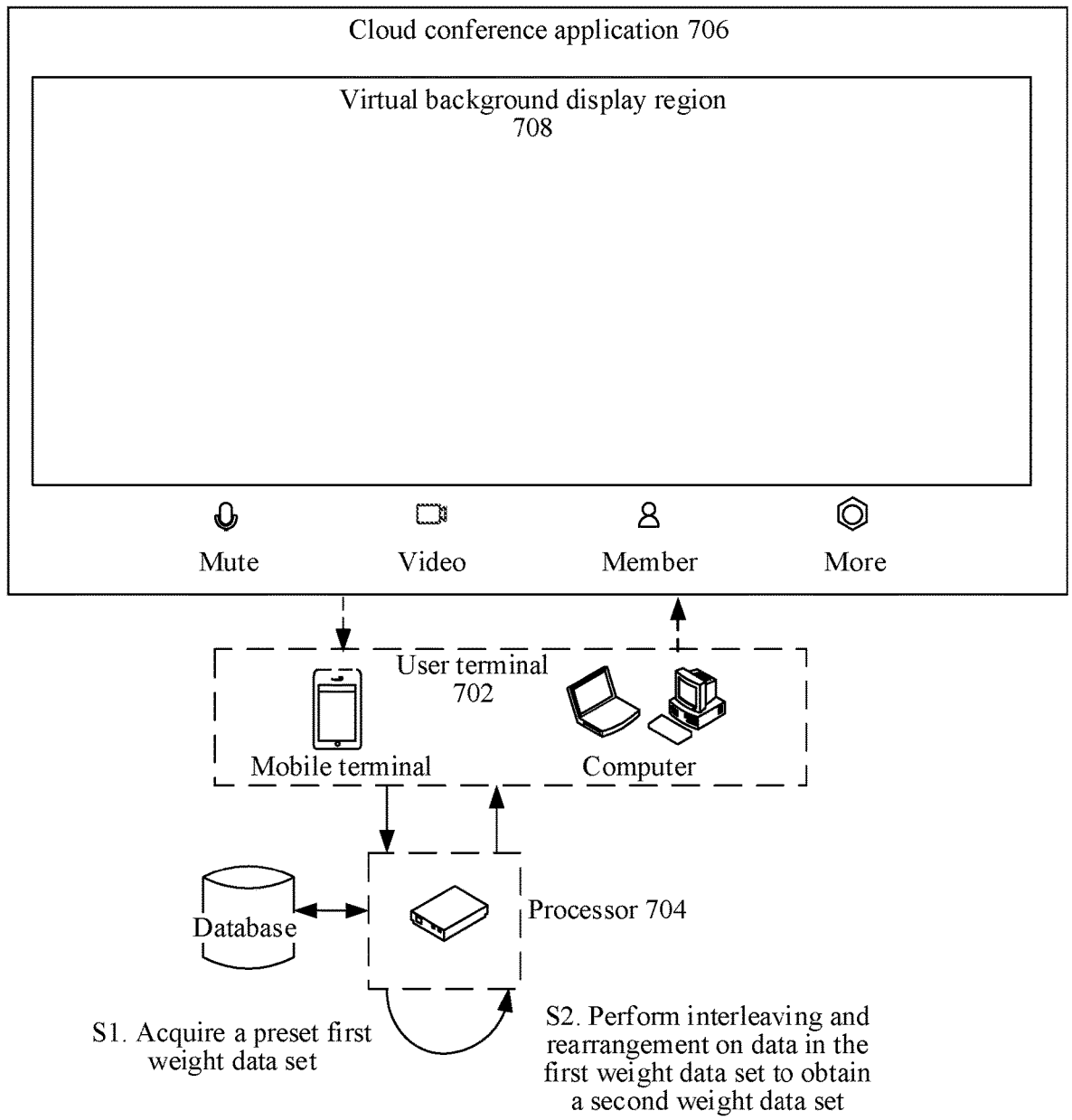
FIG. 7 is a schematic diagram of still another image data processing method according to an embodiment of this disclosure.

In an embodiment, the first weight data set may include, but is not limited to, the weight data used when the convolution kernel is used for processing the image data during performing the convolution calculation. For example, using the image data processing method being applied in a cloud conference scenario as an example, FIG. 7 is a schematic diagram of still another image data processing method according to an embodiment of this disclosure. As shown in FIG. 7, the method specifically includes, but is not limited to, the following steps:

S1. A processor 704 located in the user terminal 702 or connected to the user terminal 702 acquires a preset first weight data set; and S2. A processor 704 located in the user terminal 702 or connected to the user terminal 702 performs interleaving and rearrangement on the data in the first weight data set to obtain a second weight data set.

The first weight data set may include, but is not limited to, being stored in the database as shown in FIG. 7. The second weight data set may include, but is not limited to, being used in association with the to-be-processed second image data set to generate a virtual background in a virtual background display region 708 of a cloud conference application 706 shown in FIG. 7.

Figure 8:
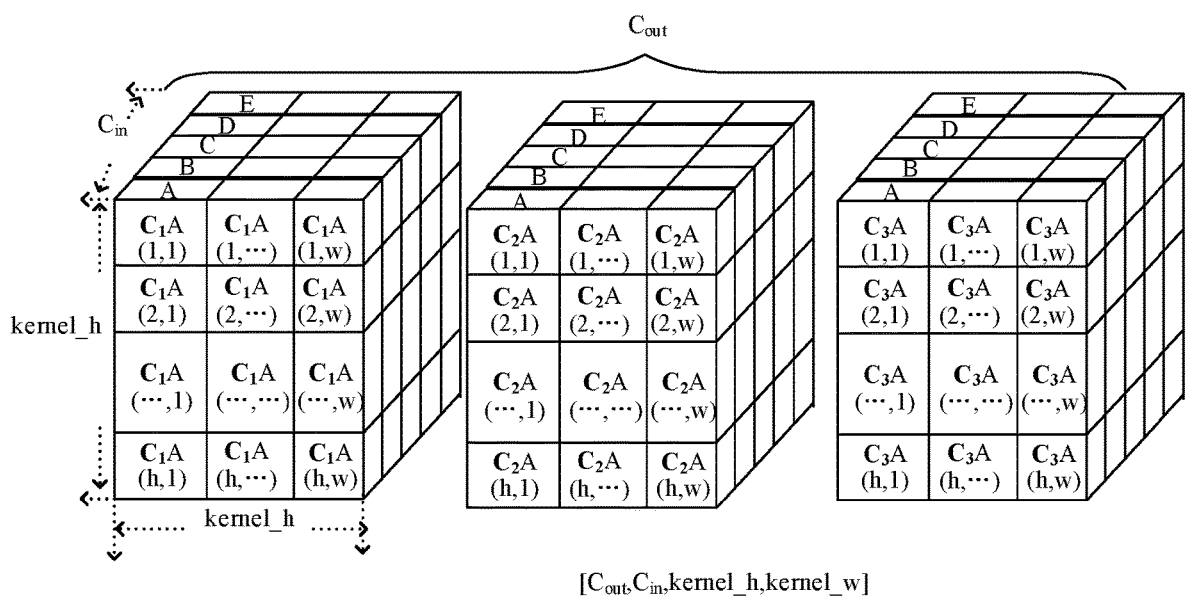
FIG. 8 is a schematic diagram of still another image data processing method according to an embodiment of this disclosure.

FIG. 8 is a schematic diagram of still another image data processing method according to an embodiment of this disclosure. In an embodiment, the image data in the first image data set being arranged according to the data format of $N_2 \times C_2 \times H_3 \times W_3$, may include, but is not limited to, the example shown in FIG. 8. $N_2$ represents the quantity of weight data subsets included in the first weight data set. It is shown in FIG. 8 that $N_2$=3, that is, $N_2=C_{out}$. $C_2$ represents the quantity of channels in each of the weight data subsets. It is shown in FIG. 8 that $C_2$=5, that is, $C_2=C_{in}$. $H_3$ represents the data height in each of the weight data subsets, $H_3$=4 shown in FIG. 8, that is, $H_3$=kernel_h. $W_3$ represents the data width in each of the weight data subsets. It is shown in FIG. 8 that $W_3$=3, that is, $W_3$=kernel_w, and "A, B, C" represent image data in different channels.

The above is only an example and is not limited in this embodiment.

In an embodiment, interleaving and rearrangement are performed on the data in the first weight data set to obtain the second weight data set. Compared with a conventional calculation mode, in which cache miss and the additional data copy overhead are prone to be caused, this embodiment reduces the probability of the occurrence of cache miss, so that the technical effects of optimizing the calculation performance of a device and improving the efficiency of processing the image data are implemented, and the technical problem of relatively low efficiency of processing image data existing in the related art is resolved.

As an embodiment, the performing interleaving and rearrangement on data in the first weight data set to obtain a second weight data set includes:
dividing weight data of each $M_2$ weight data subsets in the first weight data set into a group to obtain $S_2$ groups of weight data, where $M_2 \leq N_2$; and
performing interleaving and rearrangement on the $M_2$ weight data in each group of weight data in the $S_2$ groups of weight data to obtain the second weight data set.

Figure 9:
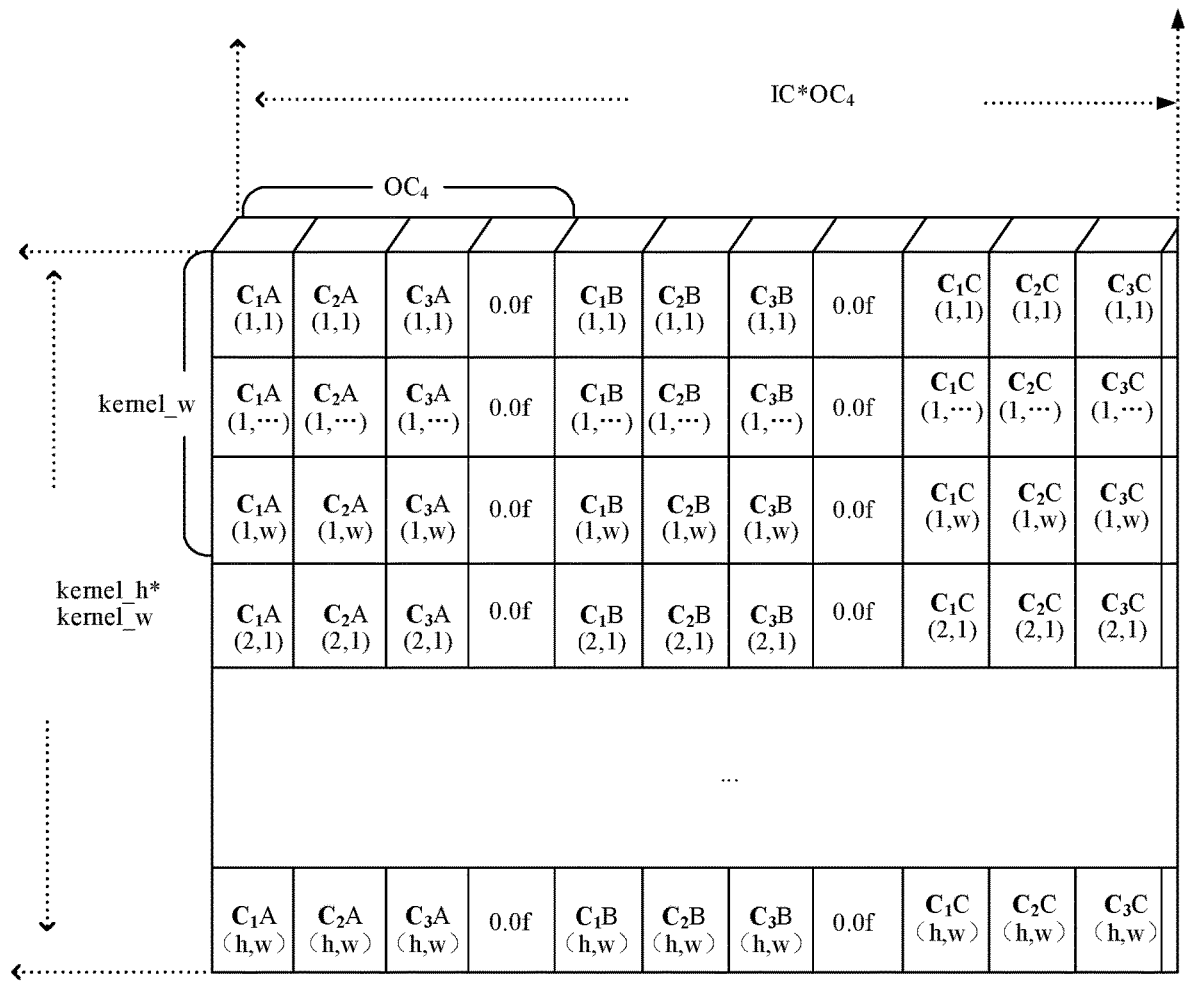
FIG. 9 is a schematic diagram of still another image data processing method according to an embodiment of this disclosure.

FIG. 9 is a schematic diagram of still another image data processing method according to an embodiment of this disclosure. In an embodiment, the performing interleaving and rearrangement on the data in the first weight data set to obtain a second weight data set may include, but is not limited to, the example shown in FIG. 9. Using $N_2$=1 as an example, the weight data of each $M_2$ weight data subsets in the first weight data set is divided into a group to obtain $S_2$ groups of weight data. Interleaving and rearrangement is performed on $M_2$ weight data in each group of weight data in $S_2$ groups of weight data to obtain a second weight data set. Using $M_2$=4 as an example, the weight data as shown in FIG. 9 is divided into C/4 groups according to each four output channels. If the quantity of output channels is not divisible by 4, then the quantity of channels is supplemented to an integer multiple of 4, and all added activation values filled with 0 are added. The weight data of dimensions of four channels in each group are rearranged in the form of interleaving (mixing), and dimensions of the input channels are arranged in order in the subsequent dimensions to obtain a data structure of $[C_{out}/4, kernel\_h, kernel\_w, C_{in}, C_{out4}]$. $OC_4$ is $C_{out4}$, and IC is $C_{in}$.

In an embodiment, the dividing the weight data of each $M_2$ weight data subsets in the first weight data set into a group to obtain $S_2$ groups of weight data includes, but is not limited to, dividing the weight data of each $M_2$ weight data subsets in the first weight data set into a group to obtain $S_2$ groups of weight data in a case that $N_2$ is an integer multiple of $M_2$, where $$S_2 = M_2 \times \frac{N_2}{M_2} \times C_2 \times H_3 \times W_3,$$

and increasing the quantity of weight data subsets in the first weight data set from $N_2$ to $N_3$ to obtain the third weight data set in a case that $N_2$ is not the integer multiple of $M_2$, where $N_3$ is the integer multiple of $M_2$, and the weight data in a channel added in the third weight data subset is 0; and dividing weight data of each $M_2$ weight data subsets in the third weight data set into a group to obtain $S_2$ groups of weight data, where $$S_2 = M_2 \times \frac{N_3}{M_2} \times C_2 \times H_3 \times W_3.$$

As an embodiment, the dividing weight data of each $M_2$ weight data subsets in the first weight data set into a group to obtain $S_2$ groups of weight data includes:
dividing weight data of each $M_2$ weight data subsets in the first weight data set into a group to obtain $S_2$ groups of weight data in a case that $N_2$ is an integer multiple of $M_2$, where $$S_2 = M_2 \times \frac{N_2}{M_2} \times C_2 \times H_3 \times W_3;$$

and
the quantity of weight data subsets in the first weight data set is added from $N_2$ to $N_3$ to obtain the third weight data set in a case that $N_2$ is not the integer multiple of $M_2$, where $N_3$ is the integer multiple of $M_2$, and the weight data in the weight data subset added in the third weight data set is 0; and dividing weight data of each $M_2$ weight data subsets in the third weight data set into a group to obtain $S_2$ groups of weight data, where $$S_2 = M_2 \times \frac{N_3}{M_2} \times C_2 \times H_3 \times W_3.$$

In an embodiment, the increasing a quantity of weight data subsets in the first weight data set from $N_2$ to $N_3$ to obtain the third weight data set in a case that $N_2$ is not an integer multiple of $M_2$ may include, but is not limited to, $$N_3 = \frac{N_2}{M_2}$$

rounding down$\times M_2$, and certainly, may also be rounded up or in other manners.

Using $N_2=3$ and $M_2=4$ as an example, if $N_2$ is not divisible by 4, $N_2$ is supplemented to a multiple of 4, and added activation values (corresponding to the image data) are all filled with 0. As shown in FIG. 9, the fourth column, the eighth column, the twelfth column, and so on are all "0.0f".

The above is only an example and is not limited in this embodiment.

In an embodiment, the weight data of each $M_2$ weight data subsets in the first weight data set is divided into a group to obtain $S_2$ groups of weight data in a case that $N_2$ is an integer multiple of $M_2$, where $$S_2 = M_2 \times \frac{N_2}{M_2} \times C_2 \times H_3 \times W_3,$$

and the quantity of weight data subsets in the first weight data set is added from $N_2$ to $N_3$ to obtain the third weight data set in a case that $N_2$ is not the integer multiple of $M_2$, where $N_3$ is the integer multiple of $M_2$, and the weight data in the weight data subset added in the third weight data set is 0; and the weight data of each $M_2$ weight data subsets in the third weight data set is divided into a group to obtain $S_2$ groups of weight data, where $$S_2 = M_2 \times \frac{N_3}{M_2} \times C_2 \times H_3 \times W_3.$$

Interleaving and rearrangement are performed on the data in the first weight data set to obtain the second weight data set. In this way, the occurrence of cache miss and the additional data copy overhead being prone to be caused in a conventional calculation mode is reduced, and the objective of reducing the probability of the occurrence of cache miss is achieved, so that the technical effects of optimizing the calculation performance of a device and improving the efficiency of processing the image data are implemented, and the technical problem of relatively low efficiency of processing image data existing in the related art is resolved.

As an embodiment, the performing interleaving and rearrangement on the $M_2$ weight data in each group of weight data in the $S_2$ groups of weight data to obtain the second weight data set includes:
performing interleaving and rearrangement on the $M_2$ weight data in each group of weight data in the $S_2$ groups of weight data to obtain the second weight data set in a case that $N_2$ is an integer multiple of $M_2$, where $$W_4 = M_2 \times \frac{N_2}{M_2} \times C_2,$$

and $H_4=H_3 \times W_3$; and
performing interleaving and rearrangement on the $M_2$ pieces of weight data in each group of weight data in the $S_2$ groups of weight data to obtain the second weight data set in a case that $N_2$ is not the integer multiple of $M_2$, where $$W_4 = M_2 \times \frac{N_3}{M_2} \times C_2, H_4 = H_3 \times W_3.$$

In an embodiment, using $M_2=4$ as an example, as shown in FIG. 9, $H_3$=kernel_h*kernel_w, $W_3$=IC*$OC_4$, a height of each set of weight data is kernel_w, and a width is $OC_4$.

The above is only an example and is not limited in this embodiment.

As an embodiment, a value of $N_2$ is a quantity of output channels of a convolution kernel, a value of $C_2$ is a quantity of input channels of the convolution kernel, the convolution operation is a convolution operation performed by using the convolution kernel, each of the weight data subsets includes weight data in the $C_2$ input channels, and each output channel includes $C_2$ input channels.

In an embodiment, each of the weight data subsets includes the weight data in the $C_2$ input channels, and the convolution operation is performed on the $C_2$ to-be-processed second image data sets based on the second weight data set by using a convolution kernel to obtain the target output result.

As an embodiment, the performing the convolution operation on the second image data set and a pre-acquired second weight data set to obtain a target output result includes:

performing the convolution operation on the second image data set and the second weight data set to obtain a fourth image data set, where the target output result includes the fourth image data set, the second image data set is an image data set obtained by performing interleaving and rearrangement on the image data of the $M_1$ channels in each group of image data in the $S_1$ groups of image data, the $S_1$ groups of image data is image data obtained by dividing the image data of each $M_1$ channels in the first image data set into a group, and $M_1 \leq C_1$.

In an embodiment, the performing a convolution operation on the second image data set and the second weight data set includes, but is not limited to, acquiring $C_2$ groups of image data in the second image data set, where each group of image data includes a plurality of pieces of image data located in a same channel in the first image data set, and each group of image data is image data obtained by offsetting one address from a storage address of a previous group of image data in the $C_2$ groups of image data, and performing a convolution operation on the $C_2$ groups of image data and the $N_2 \times C_2$ groups of weight data in the second weight data set to obtain $N_2$ groups of image data in a fourth image data set, where each group of weight data has the same data structure as each group of image data.

In an embodiment, interleaving and rearrangement are performed on the data in the first weight data set and the data in the to-be-processed first image data set. Compared with a conventional calculation mode, in which cache miss and the additional data copy overhead are prone to be caused, the probability of the occurrence of cache miss is reduced, so that the technical effects of optimizing the calculation performance of a device and improving the efficiency of processing the image data are implemented, and the technical problem of relatively low efficiency of processing image data existing in the related art is resolved.

As an embodiment, the performing the convolution operation on the second image data set and the second weight data set to obtain the third image data set includes:
  acquiring $C_2$ groups of image data in the second image data set, where each group of image data includes a plurality of pieces of image data located in a same channel in the first image data set, and each group of image data is image data obtained by offsetting one address from a storage address of a previous group of image data in the $C_2$ groups of image data; and
  performing the convolution operation on the $C_2$ groups of image data and $N_2 \times C_2$ groups of weight data in the second weight data set to obtain $N_2$ groups of image data in the third image data set, where each group of weight data has a same data structure as each group of image data,
  the second weight data set is the second weight data set obtained by performing interleaving and rearrangement on the data in the first weight data set, the weight data in the first weight data set is arranged according to the data format of $N_2 \times C_2 \times H_3 \times W_3$, $N_2$ represents the quantity of weight data subsets included in the first weight data set, $C_2$ represents the quantity of channels in each of the weight data subsets, $H_3$ represents the data height in each of the weight data subsets, and $W_3$ represents the data width in each of the weight data subsets.

In an embodiment, each group of image data being image data obtained by offsetting one address from the storage address of the previous group of image data in the $C_2$ groups of image data may include, but is not be limited to, processing image data according to a sliding window of a predetermined step size. That is, one address offset from the storage address of the previous group of image data in the $C_2$ groups of image data is a stride=1.

In an embodiment, each group of weight data and each group of image data having the same data structure, may include, but is not limited to, $M_1$ and $M_2$ being the same.

In an embodiment, the image data is obtained by offsetting one address from the storage address of the previous group of image data in the $C_2$ groups of image data to obtain each group of image data. Interleaving and rearrangement are performed on the data in the first weight data set and the data in the to-be-processed first image data set, so that the frequency of acquiring data across channels during performing the convolution calculation is reduced. Compared with a conventional calculation mode, in which cache miss and the additional data copy overhead are prone to be caused, the probability of the occurrence of cache miss is reduced, so that the technical effects of optimizing the calculation performance of a device and improving the efficiency of processing the image data are implemented, and the technical problem of relatively low efficiency of processing image data existing in the related art is resolved.

As an embodiment, the performing the convolution operation on the $C_2$ groups of image data and $N_2 \times C_2$ groups of weight data in the second weight data set to obtain $N_2$ groups of image data in the third image data set includes:
  performing a weighted summation operation on each $C_2$ groups of weight data in the $N_2 \times C_2$ groups of weight data and the $C_2$ groups of image data respectively to obtain $N_2$ groups of image data.

In an embodiment, the method may include, but is not limited to performing, by using convolution kernels one by one according to a predetermined sliding stride, a weighted summation operation on each $C_2$ groups of weight data in the $N_2 \times C_2$ groups of weight data and the $C_2$ groups of image data respectively to obtain $N_2$ groups of image data.

Figure 10:
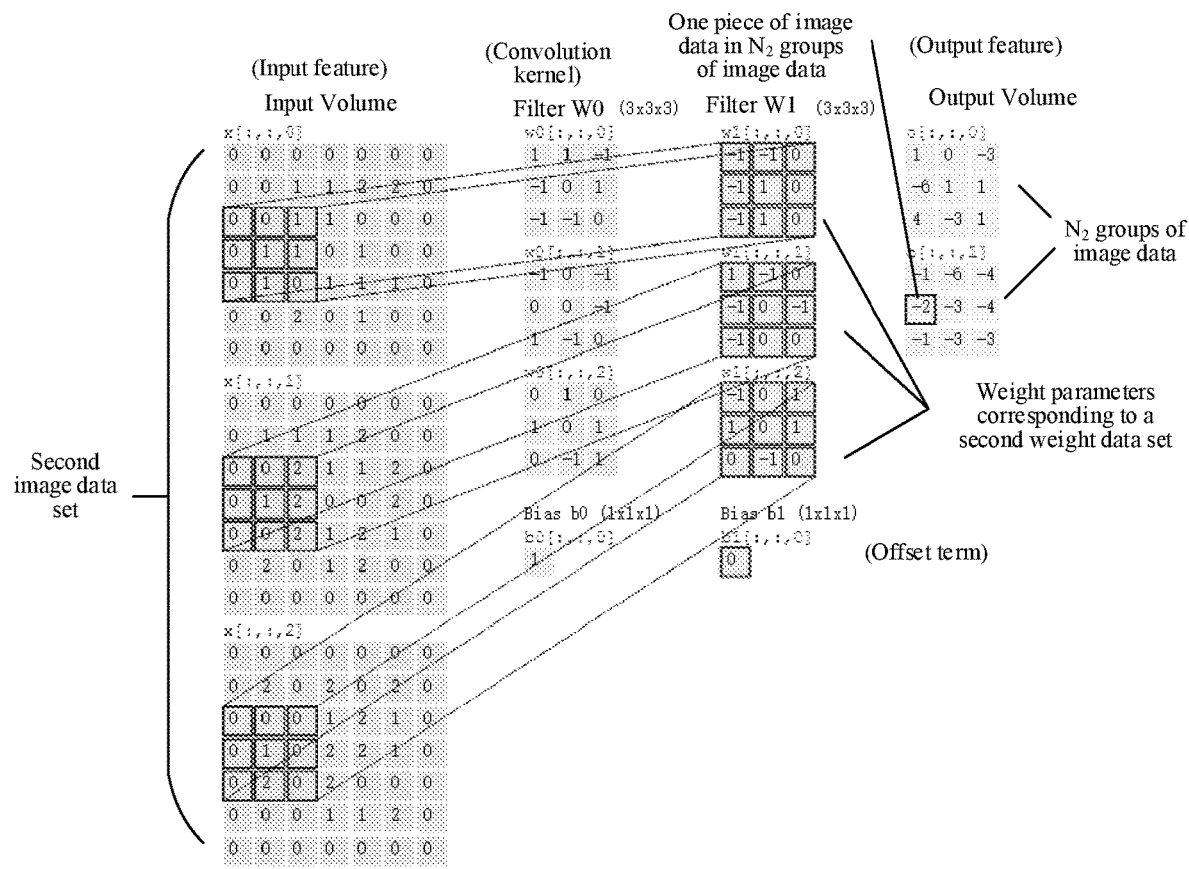
FIG. 10 is a schematic diagram of still another image data processing method according to an embodiment of this disclosure.

FIG. 10 is a schematic diagram of still another image data processing method according to an embodiment of this disclosure. As shown in FIG. 10, using the size of the convolution kernel as 3×3 as an example, by using the convolution kernel based on the corresponding weight parameters recorded in the second weight data set, weighted summation is performed on the data in the second image data set at the same position to obtain a group of image data in the $N_2$ groups of image data, and processing is continued to be performed according to a sliding window with a stride of 1 to obtain the $N_2$ groups of image data.

As an embodiment, the method further includes: storing the first image data set and the second image data set in a first memory space; and
  storing the second weight data set in a second memory space, where the first memory space and the second memory space are memory spaces independent of each other.

In an embodiment, the first memory space may include, but is not limited to, a storage space used for storing image data, such as Texture resources, and the second memory space may include, but is not limited to, a storage space used for storing weight data, such as Buffer resources.

Figure 11:
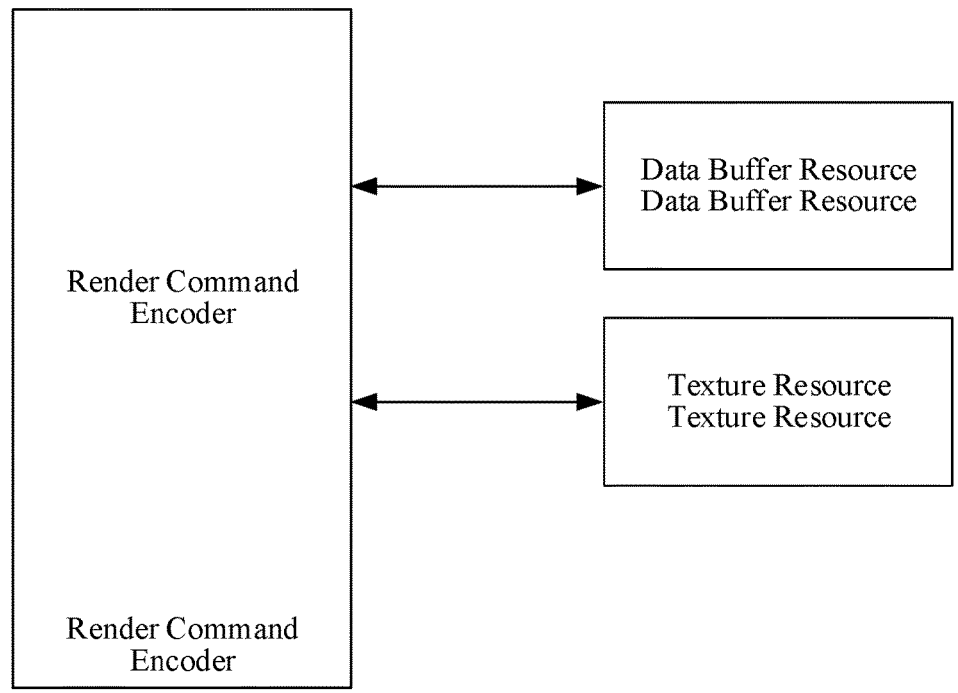
FIG. 11 is a schematic diagram of still another image data processing method according to an embodiment of this disclosure.

FIG. 11 is a schematic diagram of still another image data processing method according to an embodiment of this disclosure. As shown in FIG. 11, in the existing technical solution, when using Metal for GPU computing, generally only one type of memory (Buffer/Texture) is used as the space for data loading/storage. However, in the current calculation mode in which model design becomes more and more lightweight, an access limit of memory bandwidth often becomes a bottleneck of final performance. In an embodiment of this disclosure, Data Buffer resources and Texture resources in Metal are independent memory spaces. Therefore, conventional data performs comparison by using only one representation manner of a memory structure (Buffer/Texture), input/output saves data by using Texture, and weight/offset parameters represent storage by using Buffer. Texture and Buffer may be separately used to acquire higher memory bandwidth, reduce the probability of cache miss, and improve the performance of memory access.

For ease of description in the foregoing method embodiments, each method is described as a combination of a series of operations. However, a person skilled in the art understands that this disclosure is not limited to the order of the described operations because some steps according to this disclosure may occur in other order or occur in parallel. In addition, a person skilled in the art is also to learn that the involved actions and modules are not necessarily required to this disclosure.

Figure 12:
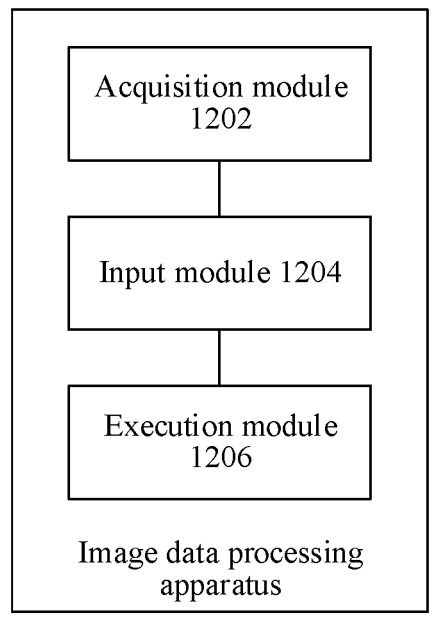
FIG. 12 is a schematic structural diagram of an image data processing apparatus according to an embodiment of this disclosure.

According to another aspect of the embodiments of this disclosure, an image data processing apparatus configured to implement the foregoing image data processing method is further provided. As shown in FIG. 12, the apparatus includes an acquisition module 1202, a processing module 1204, and an execution module 1206. One or more modules, submodules, and/or units of the apparatus can be implemented by processing circuitry, software, or a combination thereof, for example.

The acquisition module 1202 is configured to acquire a to-be-processed first image data set, image data in the first image data set being arranged according to a first data format.

The processing module 1204 is configured to perform interleaving and rearrangement on data in the first image data set to obtain a second image data set, image data in the second image data set being arranged according to a second data format, a manner of the interleaving and rearrangement matching a convolution operation, and a dimension of the second data format being less than that of the first data format.

The execution module 1206 is configured to perform the convolution operation on the second image data set and a pre-acquired second weight data set to obtain a target output result.

As an embodiment, the acquisition module includes: an acquisition unit, configured to acquire a to-be-processed first image data set, image data in the first image data set being arranged according to a first data format of $N_1 \times C_1 \times H_1 \times W_1$, where $N_1$ represents a quantity of image data subsets included in the first image data set, $C_1$ represents a quantity of channels in each of the image data subsets, $H_1$ represents a data height in each of the image data subsets in the first image data set, and $W_1$ represents a data width in each of the image data subsets in the first image data set; and the processing module includes: a processing unit, configured to perform interleaving and rearrangement on data in the first image data set to obtain a second image data set, where the image data in the second image data set is arranged in a data format of $N_1 \times H_2 \times W_2$, $H_2$ represents a data height in each of the image data subsets in the second image data set, and $W_2$ represents a data width in each of the image data subsets in the second image data set.

As an embodiment, the processing module includes: a grouping unit, configured to divide image data of each $M_1$ channels in the first image data set into a group to obtain $S_1$ groups of image data, where $M_1 \leq C_1$; and an arrangement unit, configured to perform interleaving and rearrangement on the image data of the $M_1$ channels in each group of image data in the $S_1$ groups of image data to obtain the second image data set.

As an embodiment, the grouping unit is configured to divide the image data of each $M_1$ channels in the first image data set into a group to obtain $S_1$ groups of image data, and increase a quantity of channels in the first image data set from $C_1$ to $C_2$ to obtain a third image data set in a case that $C_1$ is not the integer multiple of $M_1$, where $C_2$ is an integer multiple of $M_1$, and image data in a channel added in the third image data set is 0; and divide the image data of each $M_1$ channels in the third image data set into a group to obtain the $S_1$ groups of image data, where $$S_1 = \frac{C_2}{M_1} \times H_1 \times W_1.$$

As an embodiment, the arrangement unit is configured to perform interleaving and rearrangement on the image data of the $M_1$ channels in each group of image data in the $S_1$ groups of image data in the following manner to obtain a second image data set, and perform interleaving and rearrangement on the image data of the $M_1$ channels in each group of image data in the $S_1$ groups of image data to obtain the second image data set in a case that $C_1$ is the integer multiple of $M_1$, where $$W_2 = M_1 \times W_1, \text{ and } H_2 = \frac{C_1}{M_1} \times H_1;$$

and perform interleaving and rearrangement on the image data of the $M_1$ channels in each group of image data in the $S_1$ groups of image data to obtain the second image data set in a case that $C_1$ is not the integer multiple of $M_1$, where $$W_2 = M_1 \times W_1, \text{ and } H_2 = \frac{C_2}{M_1} \times H_1.$$

As an embodiment, the apparatus is further configured to acquire a preset first weight data set, where weight data in the first weight data set is arranged according to a data format of $N_2 \times C_2 \times H_3 \times W_3$, $N_2$ represents the quantity of image data subsets included in the first weight data set, $C_2$ represents the quantity of channels in each of the image data subsets, $H_3$ represents the data height in each of the image data subsets in the first image data set, and $W_3$ represents the data width in each of the image data subsets; and perform interleaving and rearrangement on the data in the first weight data set to obtain the second weight data set, where weight data in the second weight data set is arranged according to a data format of $H_4 \times W_4$, $H_4$ represents a data height of the weight data in the second weight data set, and $W_4$ represents a data width of the weight data in the second weight data set.

As an embodiment, the apparatus is further configured to perform interleaving and rearrangement on the data in the first weight data set in the following manner to obtain the second weight data set, and divide weight data of each $M_2$ weight data subsets in the first weight data set into a group to obtain $S_2$ groups of weight data, where $M_2 \leq N_2$; and perform interleaving and rearrangement on the $M_2$ pieces of weight data in each group of weight data in the $S_2$ groups of weight data to obtain the second weight data set.

As an embodiment, the apparatus is further configured to divide weight data of each $M_2$ weight data subsets in the first weight data set into a group in the following manner to obtain $S_2$ groups of weight data, including:
dividing the weight data of each $M_2$ weight data subsets in the first weight data set into a group to obtain the $S_2$ groups of weight data in a case that $N_2$ is an integer multiple of $M_1$, where $$S_2 = M_2 \times \frac{N_2}{M_2} \times C_2 \times H_3 \times W_3;$$

increasing a quantity of weight data subsets in the first weight data set from $N_2$ to $N_3$ to obtain a third weight data set in a case that $N_2$ is not the integer multiple of $M_2$, where $N_3$ is an integer multiple of $M_2$, and weight data in a weight data subset added in the third weight data set is 0; and dividing the weight data of each $M_2$ weight data subsets in the third weight data set into a group to obtain the $S_2$ groups of weight data, where $$S_2 = M_2 \times \frac{N_3}{M_2} \times C_2 \times H_3 \times W_3.$$

As an embodiment, the apparatus is further configured to perform interleaving and rearrangement on the $M_2$ pieces of weight data in each group of weight data in the $S_2$ groups of weight data in the following manner to obtain the second weight data set, including:
performing interleaving and rearrangement on the $M_2$ pieces of weight data in each group of weight data in the $S_2$ groups of weight data to obtain the second weight data set in a case that $N_2$ is the integer multiple of $M_2$, where $$W_4 = M_2 \times \frac{N_2}{M_2} \times C_2,$$

and
performing interleaving and rearrangement on the $M_2$ pieces of weight data in each group of weight data in the $S_2$ groups of weight data to obtain the second weight data set in a case that $N_2$ is not the integer multiple of $M_2$, where $$W_4 = M_2 \times \frac{N_3}{M_2} \times C_2,$$

and $H_4 = H_3 \times W_3$.

As an embodiment, a value of $N_2$ is a quantity of output channels of a convolution kernel, a value of $C_2$ is a quantity of input channels of the convolution kernel, the convolution operation is a convolution operation performed by using the convolution kernel, each of the weight data subsets includes weight data in the $C_2$ input channels, and each output channel includes $C_2$ input channels.

As an embodiment, the apparatus is further configured to perform the convolution operation on the second image data set and pre-acquired second weight data set in the following manner to obtain a target output result, including:
performing the convolution operation on the second image data set and the second weight data set to obtain a fourth image data set, where the target output result includes the fourth image data set, the second image data set is an image data set obtained by performing interleaving and rearrangement on the image data of the $M_1$ channels in each group of image data in the $S_1$ groups of image data, the $S_1$ groups of image data is image data obtained by dividing the image data of each $M_1$ channels in the first image data set into a group, and $M_1 \leq C_1$.

As an embodiment, the apparatus is further configured to perform the convolution operation on the second image data set and the second weight data set to obtain the fourth image data set, including:
acquiring $C_2$ groups of image data in the second image data set, where each group of image data includes a plurality of pieces of image data located in a same channel in the first image data set, and each group of image data is image data obtained by offsetting one address from a storage address of a previous group of image data in the $C_2$ groups of image data; and
performing the convolution operation on the $C_2$ groups of image data and $N_2 \times C_2$ groups of weight data in the second weight data set to obtain $N_2$ groups of image data in the fourth image data set, where each group of weight data has a same data structure as each group of image data, and
the second weight data set is a weight data set obtained by performing interleaving and rearrangement on the data in the first weight data set, the weight data in the first weight data set is arranged according to the data format of $N_2 \times C_2 \times H_3 \times W_3$, $N_2$ represents the quantity of weight data subsets included in the first weight data set, $C_2$ represents the quantity of channels in each of the weight data subsets, $H_3$ represents the data height in each of the weight data subsets, and $W_3$ represents the data width in each of the weight data subsets.

As an embodiment, the apparatus is further configured to perform the convolution operation on the $C_2$ groups of image data and $N_2 \times C_2$ groups of weight data in the second weight data set in the following manner to obtain $N_2$ groups of image data in the third image data set, including:
performing a weighted summation operation on each $C_2$ groups of weight data in the $N_2 \times C_2$ groups of weight data and the $C_2$ groups of image data respectively to obtain $N_2$ groups of image data.

As an embodiment, the apparatus is further configured to store the first image data set and the second image data set in a first memory space; and store the second weight data set in a second memory space, where the first memory space and the second memory space are memory spaces independent of each other.

Figure 13:
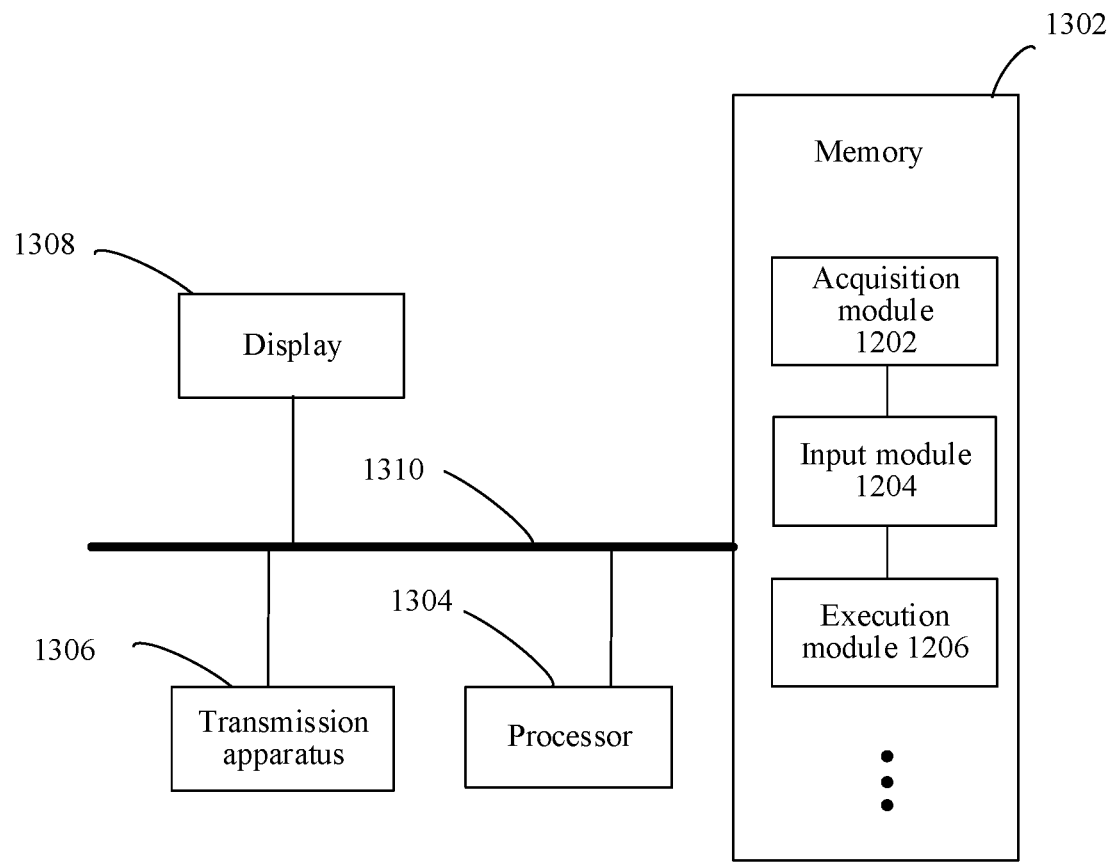
FIG. 13 is a schematic structural diagram of an electronic device according to an embodiment of this disclosure.

According to still another aspect of this disclosure, an electronic device used for implementing the image data processing method is further provided, and the electronic device may be a terminal device or a server shown in FIG. 1. This embodiment is described by using an example in which an electronic device is used as a server. As shown in FIG. 13, the electronic device includes a memory 1302 and processing circuitry, such as a processor 1304. The memory 1302 stores a computer program. The processor 1304 is configured to perform the steps in any one of the foregoing method embodiments by executing the computer program.

In an embodiment, the electronic device may be located in at least one of a plurality of network devices in a computer network.

In an embodiment, the processor may be configured to perform the following steps by executing the computer program.

S1. Acquire a to-be-processed first image data set, where image data in the first image data set is arranged according to a data format of $N_1 \times C_1 \times H_1 \times W_1$, $N_1$ represents the quantity of image data subsets included in the first image data set, $C_1$ represents the quantity of channels in each of the image data subsets, $H_1$ represents the data height in each of the image data subsets, and $W_1$ represents the data width in each of the image data subsets; and S2. Perform interleaving and rearrangement on data in the first image data set to obtain a second image data set, where image data in the second image data set is arranged according to a data format of $N_1 \times H_2 \times W_2$, and a manner of the interleaving and rearrangement matches a convolution operation; and S3. Perform the convolution operation on the second image data set and a pre-acquired second weight data set to obtain a target output result.

a person of ordinary skill in the art may understand that, the structure shown in FIG. 13 is only schematic. The electronic device may be a terminal device such as a smartphone (such as an Android mobile phone or an iOS mobile phone), a tablet computer, a palmtop computer, a mobile Internet device (MID), or a PAD. FIG. 13 does not constitute a limit on the structure of the electronic device. For example, the electronic device may further include more or fewer components (for example, a network interface) than those shown in FIG. 13, or have configuration different from that shown in FIG. 13.

The memory 1302 may be configured to store a software program and a module, for example, a program instruction/module corresponding to the image data processing method and apparatus in the embodiments of this disclosure, and the processor 1304 performs various functional applications and data processing by running the software program and the module stored in the memory 1302, that is, implementing the foregoing image data processing method. The memory 1302 may include a high-speed RAM, and may further include a non-volatile memory such as one or more magnetic storage apparatuses, a flash memory, or another non-volatile solid-state memory. In some embodiments, the memory 1302 may further include memories remotely disposed relative to the processor 1304, and the remote memories may be connected to a terminal by using a network. The foregoing examples of the network include, but are not limited to, the Internet, an intranet, a local area network, a mobile communication network, and a combination thereof. The memory 1302 may be specifically used for, but not limited to, storing information such as to-be-processed image data. As an example, as shown in FIG. 13, the memory 1302 may include, but is not limited to, an acquisition module 1202, a processing module 1204, and an execution module 1206 in the image data processing apparatus. In addition, the memory may further include, but is not limited to, other modules and units in the foregoing image data processing apparatus, and details are not described herein again in this example.

In an embodiment, the transmission apparatus 1306 is configured to receive or transmit data through a network. A specific example of the foregoing network may include a wired network and a wireless network. In an example, the transmission apparatus 1306 includes an NIC. The NIC may be connected to another network device and a router by using a network cable, so as to communicate with the Internet or a local area network. In an example, the transmission apparatus 1306 is an RF module, which communicates with the Internet in a wireless manner.

In addition, the electronic device further includes: a display 1308, configured to display image data; and a connection bus 1310, configured to connect the module components in the electronic device.

In other embodiments, the foregoing terminal device or server may be a node in a distributed system. The distributed system may be a blockchain system. The blockchain system may be formed by a plurality of nodes through network communication. A peer to peer (P2P) network may be formed between the nodes. A computing device in any form, for example, an electronic device such as a server or a terminal, may become a node in the blockchain system by joining the P2P network.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the image data processing method provided in the foregoing various implementations. The computer program being configured to perform, when being run, steps in any one of the foregoing method embodiments.

In an embodiment, the computer-readable storage medium may be configured to store a computer program configured to perform the following steps.

S1. Acquire a to-be-processed first image data set, where image data in the first image data set is arranged according to a data format of $N_1 \times C_1 \times H_1 \times W_1$, $N_1$ represents the quantity of image data subsets included in the first image data set, $C_1$ represents the quantity of channels in each of the image data subsets, $H_1$ represents the data height in each of the image data subsets, and $W_1$ represents the data width in each of the image data subsets; and S2. Perform interleaving and rearrangement on data in the first image data set to obtain a second image data set, where image data in the second image data set is arranged according to a data format of $N_1 \times H_2 \times W_2$, and a manner of the interleaving and rearrangement matches a convolution operation; and S3. Perform the convolution operation on the second image data set and a pre-acquired second weight data set to obtain a target output result.

In an embodiment, a person of ordinary skill in the art may understand that all or some of the steps of the methods in the foregoing embodiments may be implemented by a program instructing relevant hardware of the terminal device. The program may be stored in a computer-readable storage medium (such as a non-transitory computer-readable storage medium). The storage medium may include a flash disk, a read-only memory (ROM), a random access memory (RAM), a magnetic disk, an optical disc, and the like.

The sequence numbers of the foregoing embodiments of this disclosure are merely for description purpose, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this disclosure essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this disclosure.

In the foregoing embodiments of this disclosure, the descriptions of the embodiments have their respective focuses. For a part that is not described in detail in an embodiment, reference may be made to related descriptions in other embodiments.

In the several embodiments provided in this disclosure, it is to be understood that, the disclosed client may be implemented in another manner. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the technical solutions in the various embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing descriptions are merely exemplary implementations of this disclosure. A person of ordinary skill in the art may further make several improvements and modifications without departing from the principle of this disclosure, and the improvements and modifications are also considered as falling within the scope of this disclosure.

What is claimed is:

1. An image data processing method, comprising:
acquiring a first image data set that includes image data arranged according to a first data format, the first data format having a first number of dimensions;
performing interleaving and rearrangement on a channel dimension of the image data in the first image data set based on a convolution operation to obtain a second image data set with a reduction in a quantity of channels in the channel dimension of the first number of dimensions, the image data in the second image data set being arranged according to a second data format, the second data format having a second number of dimensions, the second number of dimensions of the second data format being less than the first number of dimensions of the first data format; and
generating a target output result based on the convolution operation performed on the second image data set and a second weight data set.

2. The method according to claim 1, wherein the dimensions of the second data format are a subset of the dimensions of the first data format.

3. The method according to claim 1, wherein
the first data format is $N_1 \times C_1 \times H_1 \times W_1$, $N_1$ representing a quantity of image data subsets included in the first image data set, $C_1$ representing the quantity of channels in each of the image data subsets in the first image data set, $H_1$ representing a data height in each of the image data subsets in the first image data set, and $W_1$ representing a data width in each of the image data subsets in the first image data set.

4. The method according to claim 3, wherein
the second data format is $N_1 \times H_2 \times W_2$, $H_2$ representing a data height in each of the image data subsets in the second image data set, and $W_2$ representing a data width in each of the image data subsets in the second image data set.

5. The method according to claim 4, wherein the performing the interleaving and the rearrangement comprises:
dividing the image data of each of $M_1$ channels in the first image data set into Si groups of the image data, $M_1 \leq C_1$; and
performing the interleaving and the rearrangement on the image data of the $M_1$ channels in each of the Si groups of the image data to obtain the second image data set.

6. The method according to claim 5, wherein each of the Si groups includes one of the image data from each of the $M_1$ channels.

7. The method according to claim 5, wherein
the generating the target output result includes performing the convolution operation on the second image data set and the second weight data set to obtain a fourth image data set, the target output result including the fourth image data set,
the performing the interleaving and the rearrangement on the image data in the first image data set includes performing the interleaving and the rearrangement on the image data of the $M_1$ channels in each of the $S_1$ groups of the image data in which the image data of each of the $M_1$ channels in the first image data set is divided into a group, and $M_1 \leq C_1$.

8. The method according to claim 7, wherein the generating the target output result operation comprises:
acquiring $C_2$ groups of the image data in the second image data set, each group of the image data including a plurality of pieces of the image data located in a same channel in the first image data set, and each group of the image data is obtained by offsetting one address from a storage address of a previous group of the image data in the $C_2$ groups of the image data; and
performing the convolution operation on the $C_2$ groups of the image data and $N_2 \times C_2$ groups of weight data in the second weight data set to obtain $N_2$ groups of the image data in the fourth image data set, each group of the weight data having a same data structure as each group of the image data.

9. The method according to claim 8, wherein the second weight data set is obtained by performing interleaving and rearrangement on weight data in a first weight data set, the weight data in the first weight data set being arranged according to the data format of $N_2 \times C_2 \times H_3 \times W_3$, $N_2$ representing the quantity of weight data subsets included in the first weight data set, $C_2$ representing the quantity of channels in each of the weight data subsets, $H_3$ representing the data height in each of the weight data subsets, and $W_3$ representing the data width in each of the weight data subsets.

10. The method according to claim 4, further comprising:
acquiring a first weight data set, the first weight data set including weight data that is arranged according to a data format of $N_2 \times C_2 \times H_3 \times W_3$, $N_2$ representing a quantity of weight data subsets included in the first weight data set, $C_2$ representing a quantity of channels in each of the weight data subsets, $H_3$ representing a data height in each of the weight data subsets, and $W_3$ representing a data width in each of the weight data subsets; and
performing interleaving and rearrangement on the weight data in the first weight data set to obtain the second weight data set, the weight data in the second weight data set being arranged according to a data format of $H_4 \times W_4$, $H_4$ representing a data height of the weight data in the second weight data set, and $W_4$ representing a data width of the weight data in the second weight data set.

11. The method according to claim 10, wherein the performing the interleaving and the rearrangement on the weight data in the first weight data set comprises:
dividing the weight data of each of $M_2$ weight data subsets in the first weight data set into $S_2$ groups of the weight data, $M_2 \leq N_2$; and
performing interleaving and rearrangement on the weight data from the $M_2$ weight data in each of the $S_2$ groups of the weight data to obtain the second weight data set.

12. The method according to claim 10, wherein a value of $N_2$ is a quantity of output channels of a convolution kernel, a value of $C_2$ is a quantity of input channels of the convolution kernel, the convolution operation is performed by using the convolution kernel, and each of the weight data subsets includes weight data in the $C_2$ input channels.

13. The method according to claim 1, further comprising:
storing the first image data set and the second image data set in a first memory space; and
storing the second weight data set in a second memory space,
wherein the first memory space is independent of the second memory space.

14. An information processing apparatus, comprising:
processing circuitry configured to:
acquire a first image data set that includes image data arranged according to a first data format, the first data format having a first number of dimensions;
perform interleaving and rearrangement on a channel dimension of the image data in the first image data set based on a convolution operation to obtain a second image data set with a reduction in a quantity of channels in the channel dimension of the first number of dimensions, the image data in the second image data set being arranged according to a second data format, the second data format having a second number of dimensions, the second number of dimensions of the second data format being less than first number of dimensions of the first data format; and
generate a target output result based on the convolution operation performed on the second image data set and a second weight data set.

15. The information processing apparatus according to claim 14, wherein the dimensions of the second data format are a subset of the dimensions of the first data format.

16. The information processing apparatus according to claim 14, wherein
the first data format is $N_1 \times C_1 \times H_1 \times W_1$, $N_1$ representing a quantity of image data subsets included in the first image data set, $C_1$ representing the quantity of channels in each of the image data subsets in the first image data set, $H_1$ representing a data height in each of the image data subsets in the first image data set, and $W_1$ representing a data width in each of the image data subsets in the first image data set.

17. The information processing apparatus according to claim 16, wherein
the second data format is $N_1 \times H_2 \times W_2$, $H_2$ representing a data height in each of the image data subsets in the second image data set, and $W_2$ representing a data width in each of the image data subsets in the second image data set.

18. The information processing apparatus according to claim 17, wherein the processing circuitry is configured to:
divide the image data of each of $M_1$ channels in the first image data set into Si groups of the image data, $M_1 \leq C_1$; and
perform the interleaving and the rearrangement on the image data of the $M_1$ channels in each of the $S_1$ groups of the image data to obtain the second image data set.

19. The information processing apparatus according to claim 18, wherein each of the $S_1$ groups includes one of the image data from each of the $M_1$ channels.

20. A non-transitory computer-readable storage medium, storing instructions which when executed by a processor cause the processor to perform:
acquiring a first image data set that includes image data arranged according to a first data format, the first data format having a first number of dimensions;
performing interleaving and rearrangement on a channel dimension of the image data in the first image data set based on a convolution operation to obtain a second image data set with a reduction in a quantity of channels in the channel dimension of the first number of dimensions, the image data in the second image data set being arranged according to a second data format, the second data format having a second number of dimensions, the second number of dimensions of the second data format being less than first number of dimensions of the first data format; and
generating a target output result based on the convolution operation performed on the second image data set and a second weight data set.

* * * * *